United States Patent [19]

Lundholm et al.

[11] 4,235,445

[45] Nov. 25, 1980

[54] SEALING SYSTEM FOR PISTON ROD OF HOT GAS ENGINE

[76] Inventors: Sven G. K. Lundholm, Mantalskroken 9,, S-222 47 Lund; Sven Ä. V. Ringqvist, Bagevägen 56, S-230 47 Akarp, both of Sweden

[21] Appl. No.: 6,806

[22] Filed: Jan. 25, 1979

[51] Int. Cl.³ .................. F16J 15/24; F16K 39/00
[52] U.S. Cl. .................................. 277/30; 277/32
[58] Field of Search .............. 277/15, 30, 32, DIG. 6, 277/237 R

[56] References Cited

U.S. PATENT DOCUMENTS

| | | | |
|---|---|---|---|
| 3,284,086 | 11/1966 | Primrose et al. | 277/DIG. 6 |
| 4,083,566 | 4/1978 | Bengtsson et al. | 277/15 |
| 4,146,237 | 3/1979 | Bergman | 277/15 |

FOREIGN PATENT DOCUMENTS

| | | | |
|---|---|---|---|
| 9753 of 1886 | United Kingdom | | 277/30 |
| 12576 of 1849 | United Kingdom | | 277/30 |

Primary Examiner—Robert I. Smith
Attorney, Agent, or Firm—Finnegan, Henderson, Farabow, Garrett & Dunner

[57] ABSTRACT

An improvement to a sealing system for restricting fluid flow around a piston rod between a piston cylinder and crankshaft space in a hot gas engine where a seal element is secured around the piston rod in an intermediate chamber, the improvement including a link in the crankshaft space connecting, and permitting relative radial motion between, the piston rod and the crosshead and an O-ring having a diameter substantially greater than that of the piston rod and being secured between a lower ring securing the seal element in place around the piston rod and a wall of the intermediate chamber for frictionally restricting radial movement of the lower ring.

7 Claims, 2 Drawing Figures

U.S. Patent     Nov. 25, 1980     4,235,445
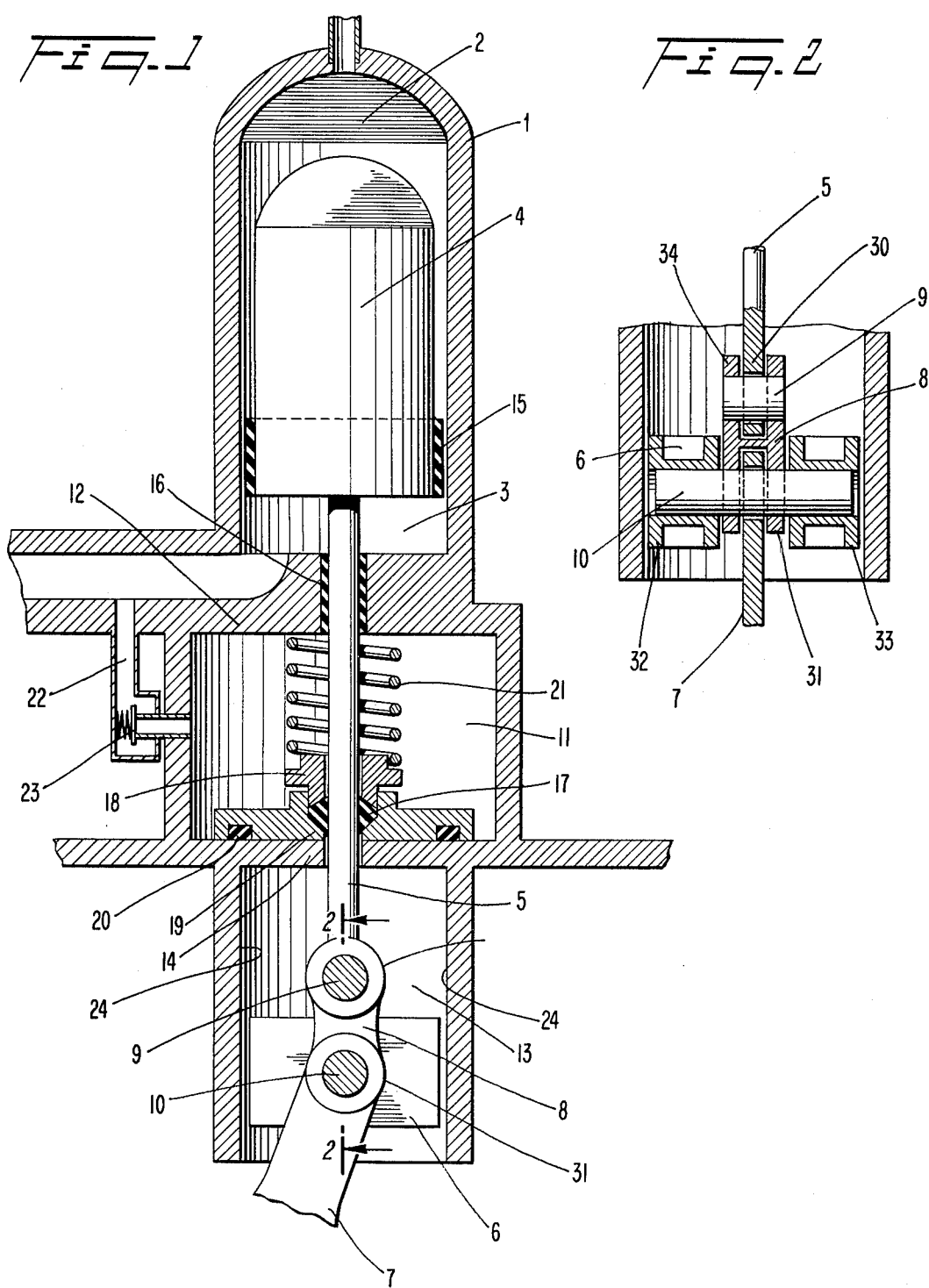

SEALING SYSTEM FOR PISTON ROD OF HOT GAS ENGINE

BACKGROUND OF THE INVENTION

1. Field of the Invention

The invention relates to a sealing system for restricting leakage of fluid around a piston rod interconnecting a piston located in a cyclical high pressure piston cylinder and a crosshead located in a lower pressure, crankshaft space. More particularly, the invention relates to an improved sealing system having a seal element around the piston rod within an intermediate chamber between the crankshaft space and the piston cylinder where the improvement is a means for reducing the radial forces on the seal element caused by the piston rod.

2. Description of the Prior Art

In a hot gas engine, such as one using the Stirling cycle, many solutions have been developed to prevent leakage of the working gas from the piston cylinder into the crankshaft space and leakage of lubrication fluid in the crankshaft space into the piston cylinder. Most of this leakage occurs around the piston rod which interconnects the piston in the piston cylinder with the crankshaft in the crankshaft space.

One type of sealing system is disclosed in U.S. Pat. No. 3,848,877 to Bengtsson et al, of common assignment with present invention. The system taught in Bengtsson et al is effective in preventing fluid flow between the piston cylinder and crankshaft space by providing around the piston rod between the piston cylinder and crankshaft space a seal element in the form of a ring having a conical cross section which is urged against the piston rod by mating spring-loaded metal wedge rings. However, because of the differences in radial play of the piston in the cylinder and of the crankshaft crosshead in the crankshaft space, the piston rod imposed radial stresses on the seal element thereby reducing the effectiveness and durability of the seal element.

The piston in its piston cylinder has very little space in a radial direction in which to move, however, the crosshead in the crankshaft space which interconnects the piston rod with the crankshaft has significantly greater radial space for movement. This greater radial movement of the crosshead causes the piston rod to exert substantial radial forces on the seal element usually located in an intermediate chamber between the piston cylinder and the crankshaft space. Because the radial forces vary in a cyclical manner, they are detrimental to the function of the sealing system surrounding the piston rod. Breakdown of the seal element in the sealing system or its distortion due to the radial forces of the piston rod reduces the sealing system's effectiveness in restricting fluid flow between the crankshaft space and the intermediate chamber. Such reduced effectiveness may permit the escape of working gas from the piston cylinder through the intermediate chamber into the crankshaft space or permit the leakage of lubricating oil from the crankshaft space into the intermediate chamber.

The present invention is intended to provide a remedy to the problems engendered by the radial movement of the piston rod. The invention allows relative radial movement between the piston rod and the crosshead, thus minimizing the radial forces of the piston rod on the seal element. Furthermore, the invention provides a means for more effectively securing the seal element in the intermediate chamber in opposition to the minimized radial forces of the piston rod.

The advantages offered by the invention permit the necessary radial play of the crosshead, which may be significantly greater than the radial play of the piston in the piston cylinder, while substantially reducing the radial play of the piston rod at the seal between the intermediate chamber and the crankshaft space. This reduction in radial movement of the piston rod increases the effectiveness of, and prolongs the life of, the sealing system.

SUMMARY OF THE INVENTION

In accordance with the invention, as embodied and broadly described herein, there is provided an improved sealing system for restricting fluid passage around the periphery of a piston rod between a piston chamber and a crankshaft space in a hot gas engine, where one end of the piston rod is attached to a piston in the piston cylinder and the other end of the piston rod is in the crankshaft space for attachment to a crosshead movably guided by the walls of the crankshaft space and for driving the crankshaft of the engine and where the sealing system includes an intermediate chamber between the piston cylinder and the crankshaft space through which the piston rod passes and in which is secured an annular seal element around the piston rod, a first wall separating the intermediate chamber from the crankshaft space for restricting fluid passage between the crankshaft space and the intermediate chamber, the improvement comprising means articulately attaching the other end of the piston rod to the crosshead for permitting relative radial movement between the piston rod and crosshead and for minimizing radial forces imposed on the seal element by the piston rod.

As here embodied, the means for permitting radial movement between the piston rod and crosshead is a link rotatably attached at a first end to the other end of the piston rod and rotatably attached at a second end to the crosshead, the axes of rotation of the ends of the link being substantially normal to the longitudinal axis of the piston rod.

Preferably, where the sealing system also includes upper and lower securing rings each having a central opening for the passage of the piston rod to secure the seal element therebetween and around the piston rod and a spring acting between a second wall of the intermediate chamber opposite the first wall and the upper securing ring which biases the seal element between the rings and biases the lower ring to the first wall, the sealing system has a further improvement which comprises an O-ring seal having a diameter greater than three times the diameter of the piston rod secured between the lower ring and the first wall proximate the circumferential periphery of the lower ring, the O-ring seal frictionally holding the lower ring stationary relative to the first wall.

The accompanying drawings which are incorporated in and constitute a part of the specification, illustrate one embodiment of the invention and, together with the description, serve to explain the principles of the invention.

BRIEF DESCRIPTION OF THE DRAWINGS

FIG. 1 is a vertical cross section depicting the piston in the piston cylinder, the elements of the sealing system in the intermediate chamber, and the link element interconnecting the piston rod to the crosshead in a portion of the crankshaft space.

FIG. 2 is a vertical cross section view of the link and crosshead taken along line 2—2 of FIG. 1.

DESCRIPTION OF THE PREFERRED EMBODIMENT

Reference will now be made in detail to the present preferred embodiment of the invention, an example of which is illustrated in the accompanying drawings.

In FIG. 1, piston 4 is movably mounted in piston cylinder 1 and divides the piston cylinder 1 into a high temperature, variable volume chamber 2 and a low temperature, variable volume chamber 3. Piston 4 is carried by and attached to one end of a rectilinearly-reciprocating piston rod 5, the other end 30 of which is attached to crosshead 6 in crankshaft space 13, the crosshead in turn being attached to the crankshaft (not shown) by connecting rod 7. The piston 4 is provided with a piston seal 15 which allows a slight radial play within the cylinder 1. The play of the piston 4 in cylinder 1 is exaggerated in FIG. 1; it may be approximately 0.01 mm.

The sealing system includes an intermediate chamber 11 between the piston cylinder 1 and crankshaft space 13 and is separated from the piston chamber 3 by a second wall 12 and from the crankshaft space 13 by first wall 14. The piston rod passes through an opening in the second wall 12 around the inner periphery of which is a seal element 16 and passes through an opening in the first wall 14 for connection to the crosshead 6 in the crankshaft space 13.

Within the intermediate chamber 11 an annular seal element 17 is secured around the piston rod 5 proximate the first wall 14 for restricting fluid passage between the crankshaft space 13 and the intermediate chamber 11.

In accordance with the invention, the sealing system is improved by providing means for articulately attaching the other end of the piston rod to the crosshead for permitting relative radial movement between the piston rod and crosshead and for minimizing radial forces imposed on the sealing element by the piston rod.

Preferably, as here embodied and depicted in FIGS. 1 and 2, means for permitting relative radial movement between the piston rod 5 and crosshead 6 is a link 8 rotatably attached at a first end 34 by trunnion 9 to the other end 30 of piston rod 5 and rotatably attached at a second end 31 by trunnion 10 to the crosshead 6. The axes of rotation of the ends 34 and 31 of the link 8 around trunnions 9 and 10 are substantially normal to the longitudinal axis of the piston rod 5 and substantially parallel to each other.

As seen in FIG. 2, the second end 31 of the link 8 is interposed between two sections 32 and 33 of the crosshead 6 and trunnion 10 interconnects the two sections 32 and 33 of the crosshead 6 and passes through an opening in the second end 31 of the link 8. The piston rod 5 is secured to the trunnion 9 and the connecting rod 7 is secured to the trunnion 10.

Because of the action of the connecting rod 7 connecting the crankshaft (not shown) to the crosshead 6, the radial space for movement of the crosshead 6 between the guiding walls 24 of the crankshaft space 13 is greater that the space for radial movement of the piston 4 within the cylinder 1. A space for radial movement of the crosshead 6 is exaggerated in FIGS. 1 and 2 and may be approximately 0.07 mm. In operation, the link 8 permits the significant radial movement of crosshead 6 without imparting significant radial movement to the other end 34 of the piston rod 5. Because the other end 34 of the piston rod 5 is connected to the crosshead 6 by the articulating link 8, significant stresses or radial movement imposed on the crosshead 6 by connecting rod 7 are not transmitted to the seal element 17.

As depicted in FIG. 1, seal 16 allows some fluid leakage between chamber 3 and intermediate chamber 11 and intermediate chamber 11 is in fluid flow communication through conduit 22 to chamber 3. Non-return valve 23 in conduit 22 allows flow of gas only from intermediate chamber 11 to chamber 3 so that as the volume of chamber 3 varies, the pressure in intermediate chamber 11 corresponds to the minimum pressure in chamber 3. During operation, the pressure in chamber 11, which may be as high as 150 Kg/cm$^2$, will act on seal element 17 preventing any significant radial movement of piston rod 5. Stresses which might otherwise be imposed on piston rod 5 and crosshead 6 by the pressure in chamber 11 are alleviated by link 8 which permits relative radial movement of crosshead 6 despite the restriction on such movement by piston rod 5.

Preferably, where the sealing system includes upper and lower securing rings each having a central opening for passage of the piston rod securing the seal element therebetween and a spring acting between a second wall of the intermediate chamber opposite the first wall and the upper securing ring for biasing the seal element between the rings and biasing the lower ring to the first wall, the sealing system is further improved by providing an O-ring seal secured between the lower ring and the first wall proximate the circumferential periphery of the lower ring, the O-ring seal having a diameter substantially greater than the diameter of the piston rod. The O-ring seal frictionally holds the lower ring substantially stationary relative to the first wall.

As here embodied and depicted in FIG. 1, the seal element 17 in intermediate chamber 11 is secured between upper securing ring 18 and lower securing ring 19. Each securing ring 18, 19 has a central opening through which the piston rod 5 passes. Spring 21, coaxial with piston rod 5, acts between second wall 12 and upper securing ring 18 for biasing the seal element 17 between the securing rings and biasing the lower securing ring 19 to the first wall 14.

The sealing system is improved by an O-ring seal 20 having a diameter approximately three times the diameter of the piston rod 5 secured between the lower securing ring 19 and the first wall 14 proximate the circumferential periphery of the lower securing ring 19.

The O-ring seal 20 biased between the outer periphery of the lower securing ring 19 and the first wall 14 frictionally holds the lower securing ring 19 substantially stationary relative to the first wall 14. Thus, because link 8 does not completely eliminate all radial movement of piston rod 5, the additional resistance to radial movement provided by the large-diameter O-ring 20 holds the securing element 17 in position thereby increasing its effectiveness.

It will be apparent to those skilled in the art that various modifications and variations can be made in the present invention without departing from the scope or spirit of the invention. It is intended, therefore, that the present invention cover the modifications and variations which come within the scope of the appended claims or their equivalents.

What is claimed is:

1. In a sealing system restricting fluid passage around the periphery of a piston rod between a piston cylinder and a crankshaft space in a hot gas engine, where one end of said piston rod is attached to a piston in said piston cylinder and the other end of the piston rod is in the crankshaft space for attachment to a crosshead movably guided by the walls of said crankshaft space and driving the crankshaft of said engine and where the sealing system includes an intermediate chamber between said piston cylinder and crankshaft space through which said piston rod passes and in which is secured an annular seal element around said piston rod proximate a first wall separating said intermediate chamber from said crankshaft space for restricting fluid passage between the crankshaft space and the intermediate chamber, the improvement comprising:

means articulately attaching the other end of said piston rod to said crosshead for permitting relative radial movement between said piston rod and crosshead and minimizing radial forces imposed on said seal element by said piston rod.

2. The sealing system of claim 1 wherein said attaching means is a link rotatably attached at a first end to the other end of said piston rod and rotatably attached at a second end to said crosshead, the axes of rotation of the ends of said link being substantially normal to the longitudinal axis of said piston rod.

3. The sealing system as in claim 1 where upper and lower securing rings each having a central opening for the passage of said piston rod secure the seal element therebetween around the piston rod and where a spring acts between a second wall of said intermediate chamber opposite the first wall and said upper securing ring for biasing said seal element between said rings and biasing said lower ring to said first wall, the improvement further comprises an O-ring seal having a diameter substantially greater than the diameter of said piston rod being secured between said lower ring and said first wall proximate the circumferential periphery of said lower ring, said O-ring seal frictionally holding said lower ring substantially stationary relative to said first wall.

4. A sealing system for restricting fluid passage around a piston rod in a Stirling cycle hot gas engine attached at one end to a piston in a working gas-filled piston cylinder and attached at the other end to a crosshead in a lower pressure, crankshaft space, comprising:

(a) an intermediate chamber between and coaxial with said piston cylinder and crankshaft space having a first wall separating said intermediate chamber and crankshaft space and a second wall opposite said first wall separating said intermediate chamber and piston cylinder, said piston rod being movably positioned in centrally located, coaxial openings in said first and second walls;

(b) an annular seal element in said intermediate chamber around said piston rod proximate said first wall;

(c) means in said intermediate chamber for securing said seal element around said piston rod and for opposing radial forces imposed on said seal element by said piston rod; and (d) means in said crankshaft space articulately attaching the other end of said piston rod to said crosshead for permitting relative radial movement between said piston rod and crosshead to minimize radial forces imposed on said seal element by said piston rod.

5. The sealing system of claim 4 wherein said securing means comprises:

(a) an upper securing ring having a central opening coaxial with said piston rod;

(b) a lower securing ring resting on said first wall and having a central opening coaxial with said piston rod, said securing rings being complementary and securing therebetween said annular seal element;

(c) a spring, coaxial with said piston rod, acting between said second wall and said upper securing ring, said spring biasing said upper ring towards said lower ring for wedging said seal element in place and biasing said lower ring towards said first wall; and (d) an O-ring seal having a diameter substantially greater than the piston and being secured between said lower ring and said first wall proximate the circumferential periphery of said lower ring for frictionally holding said lower ring stationary relative to said first wall.

6. The sealing system of claim 4 wherein said attaching means comprises a link having first and second ends, said first end being rotatably attached to the other end of said piston rod and said second end being rotatably attached to said crosshead, the axes of rotation of the ends of said link being substantially parallel to each other and substantially normal to the longitudinal axis of said piston rod.

7. A sealing system for restricting fluid passage around a piston rod in a Stirling cycle hot gas engine attached at one end to a piston in a working gas-filled piston cylinder and attached at the other end to a crosshead in a lower pressure, crankshaft space, comprising:

(a) an intermediate chamber between and coaxial with said piston cylinder and crankshaft space having a first wall separating said intermediate chamber and crankshaft space and a second wall opposite said first wall separating said intermediate chamber and piston cylinder, said piston rod being movably positioned in centrally located, coaxial openings in said first and second walls;

(b) an annular seal element in said intermediate chamber around said piston rod proximate said first wall;

(c) an upper securing ring in said intermediate chamber having a central opening coaxial with said piston rod;

(d) a lower securing ring in said intermediate chamber resting on said first wall and having a central opening coaxial with said piston rod, said securing rings being complementary and securing therebetween said annular seal element;

(e) a spring coaxial with said piston rod and acting between said second wall and said upper securing ring, said spring biasing said upper ring towards said lower ring for wedging said seal element in place and biasing said lower ring towards said first wall;

(f) an O-ring seal having a diameter substantially three times the piston rod diameter and being secured between said lower ring and said first wall proximate the circumferential periphery of said lower ring for frictionally holding said lower ring stationary relative to said first wall; and (g) a link in said crankshaft space having first and second ends, said first end being rotatably attached to the other end of said piston rod and said second end being rotatably attached to said crosshead, the axes of rotation of the ends of said link being substantially parallel to each other and substantially normal to the longitudinal axis of said piston rod, said link permitting relative radial movement between said piston rod and crosshead to minimize radial forces imposed on said seal element by said piston rod.

\* \* \* \* \*